United States Patent
Hurley

(10) Patent No.: US 6,608,252 B2
(45) Date of Patent: Aug. 19, 2003

(54) WIRE PROTECTING RING APPARATUS AND METHOD OF USING SAME

(76) Inventor: Paul T. Hurley, 2234 W. Bluefield Ave., Phoenix, AZ (US) 85023

( * ) Notice: Subject to any disclaimer, the term of this patent is extended or adjusted under 35 U.S.C. 154(b) by 0 days.

(21) Appl. No.: 10/152,056

(22) Filed: May 21, 2002

(65) Prior Publication Data

US 2002/0179317 A1 Dec. 5, 2002

Related U.S. Application Data

(60) Provisional application No. 60/293,927, filed on May 29, 2001.

(51) Int. Cl.[7] .............................................. H01H 13/04
(52) U.S. Cl. ............................. 174/58; 174/53; 174/66; 220/241; 33/DIG. 10
(58) Field of Search ..................... 174/58, 50, 53, 174/66, 67; 220/3.8, 3.2, 3.3, 241, 242; 33/528, DIG. 10, 562, 194

(56) References Cited

U.S. PATENT DOCUMENTS

| | | | | |
|---|---|---|---|---|
| 1,935,565 A | * | 11/1933 | Goetzelman | 220/241 |
| 1,956,196 A | * | 4/1934 | Korad | 220/241 |
| 2,788,151 A | * | 4/1957 | Shore | 220/3.4 |
| 3,601,276 A | * | 8/1971 | Culpepper | 220/3.4 |
| 4,979,633 A | | 12/1990 | Lakey | |
| 5,301,437 A | | 4/1994 | Burke | |
| 5,562,222 A | | 10/1996 | Jordan et al. | |
| 5,639,991 A | | 6/1997 | Schuette | |
| 5,710,392 A | | 1/1998 | Bordwell et al. | |
| 6,166,329 A | * | 12/2000 | Oliver et al. | 174/58 |
| 6,403,883 B1 | * | 6/2002 | Morgan et al. | 174/58 |

\* cited by examiner

*Primary Examiner*—Dean A. Reichard
*Assistant Examiner*—Angel R. Estrada

(57) ABSTRACT

A protective ring apparatus includes a back plate and a riser wall which projects outward from the back plate. The riser wall is located peripheral to a back plate central access channel. A front frame is connected to a top portion of the riser wall, and the front frame defines a front frame access channel which is in registration with the back plate central access channel. A pair of twist links, located along a common link axis, are connected to opposite sides of the front frame. A removable protector plate is connected to the pair of twist links and, prior to its removal, covers and prevents wires in an open electrical box from being cut by a cutting tool used to cut a window in a sheet of drywall to be installed around an electrical box framed by the plaster ring apparatus.

9 Claims, 3 Drawing Sheets

WIRE PROTECTING RING APPARATUS AND METHOD OF USING SAME

CROSS-REFERENCE TO RELATED APPLICATION

This application claims priority based upon my Provisional Application Serial No. 60/293,927, filed May 29, 2001.

BACKGROUND OF THE INVENTION

1. Field of the Invention

The present invention relates generally to protectors of electrical wires and, more particularly, to protectors of wires in electrical utility boxes especially adapted for protecting the wires when drywall or wallboard is installed outside the electrical utility boxes.

2. Description of the Prior Art

With wires that are present in electrical utility boxes, it is often desirable to protect those wires from damage, especially from damage during construction where drywall or wallboard is being installed outside the electrical utility boxes. Plane sheets of drywall or wallboard do not contain openings allowing access to electrical utility boxes. In this respect, access holes must be cut in the drywall or wallboard to gain access to the wires in the electrical utility boxes. To assure proper locating of the access holes, the plane sheet of drywall or wallboard is often placed over a electrical utility box, and an access hole is cut in the drywall or wallboard. The cutting of the access holes in the drywall poses the greatest danger of damaging the electrical wires in the electrical utility boxes. In this respect, it would be desirable if wires inside electrical utility boxes could be protected from damage during cutting operations of cutting access holes in the drywall or wallboard. Subsequently below, statements relating to drywall are understood to relate also to wallboard.

Throughout the years, a number of innovations have been developed relating to protecting electrical wiring inside electrical utility boxes, in circumstances such as when drywall is being installed adjacent to the electrical utility boxes, and the following U. S. patents are representative of some of those innovations: U.S. Pat. Nos. 4,979,633, 5,301,437, 5,562,222, 5,639,991, and 5,710,392. More specifically, each of U.S. Pat. Nos. 4,979,633, 5,301,437, 5,562,222, 5,639,991, and 5,710,392 share a common characteristic. That is, a separate and distinct cover is first installed on an electrical utility box when there is a need to protect the electrical wiring, and then the separate and distinct cover is completely removed from the electrical utility box when there is no longer a need to protect the electrical wiring. In this respect, with the patents set forth above, there is a need to carry out an installation procedure, and there is a need to carry out a substantially reversed removal procedure. In this sense, the installation procedure and the removal procedure require duplicate efforts in reverse. In order to save time, it would be desirable if a protector for electrical wiring in an electrical utility box were provided that does not require duplicate efforts in reverse for installation and removal.

Another common characteristic shared by the patents cited above is that the protector for electrical wiring in an electrical utility box does not have an additional function of serving as a guide for the drywall which is installed. In this respect, it would be desirable if such an electrical wiring protector is provided that also serves as a guide for drywall that is installed.

Generally, with the patents cited above, a hand tool is need both to install and remove the respective electrical utility box protector. For purposes of simplicity and efficiency, it would be desirable if an electrical utility box protector were provided that includes a protector portion that can be readily removed by hand, without the need for a hand tool, when the wiring protective function is no longer needed.

Often when access holes are cut in drywall to access electrical utility boxes, the inner borders of the cut access holes are rough and uneven. To reduce roughness or unevenness immediately adjacent to the access holes, it would be desirable to provide a ring around the access holes, wherein the ring is a part of the overall electrical wiring protector.

Thus, while the foregoing body of prior art indicates it to be well known to use protectors for electrical wiring in electrical utility boxes, the prior art described above does not teach or suggest a wire protecting ring apparatus which has the following combination of desirable features: (1) protects wires inside electrical utility boxes from damage during cutting operations of cutting access holes in drywall or wallboard; (2) does not require duplicate efforts in reverse, for installation and removal; (3) serves as a guide for drywall that is installed; (4) includes a protector portion that can be readily removed by hand, without the need for a hand tool, when the wiring protective function is no longer needed; and (5) provides a ring around the access holes, wherein the ring is a part of the electrical wiring protector. The foregoing desired characteristics are provided by the unique wire protecting ring apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a ring apparatus which includes a back plate which has peripheral fastener reception slots and which has a back plate central access channel. A riser wall projects outward from the back plate, wherein the riser wall is located peripheral to the back plate central access channel. A front frame is connected to a top portion of the riser wall, wherein the front frame defines a front frame access channel which is in partial registration with the back plate central access channel. The front frame includes fastener reception channels. A pair of links are connected to opposite sides of the front frame, wherein the links are located along a common link axis. A removable protector plate or partition is connected to the pair of links, wherein the removable protector plate is located in the front frame access channel and covers the back plate central access channel. Preferably, the links are twist links, and the removable protector plate is separated from the twist links by twisting the removable protector plate around on the twist links, around the link axis. Prior to removal of the removable protector plate, the removable protector plate prevents wires in an open electrical box from being cut by a cutting tool that is used to cut a window in a sheet of drywall.

Preferably, the back plate and the front frame lie in spaced-apart parallel planes. Preferably, the,riser wall has a height that is approximately equal to a thickness of a sheet of drywall.

With one embodiment of the invention, the front frame access channel and the back plate central access channel are large enough to receive a single electrical receptacle. With another embodiment, the front frame access channel and the back plate central access channel are large enough to receive two electrical receptacles. In addition, it is contemplated that embodiments of the invention can be made to accommodate up to nine electrical receptacles or switches.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wire protecting ring apparatus which has all of the advantages of the prior art and none of the disadvantages.

It is another object of the present invention to provide a new and improved wire protecting ring apparatus which may be easily and efficiently manufactured and marketed.

It is a further object of the present invention to provide a new and improved wire protecting ring apparatus which is of durable and reliable construction.

An even further object of the present invention is to provide a new and improved wire protecting ring apparatus which is susceptible of a low cost of manufacture with regard to both materials and labor, and which accordingly is then susceptible of low prices of sale to the consuming public, thereby making such wire protecting ring apparatus available to the buying public.

Still yet a further object of the present invention is to provide a new and improved wire protecting ring apparatus which protects wires inside electrical utility boxes from damage during cutting operations of cutting access holes in drywall or wallboard.

Still another object of the present invention is to provide a new and improved wire protecting ring apparatus that does not require duplicate efforts in reverse, for installation and removal.

Yet another object of the present invention is to provide a new and improved wire protecting ring apparatus which serves as a guide for drywall that is installed.

Even another object of the present invention is to provide a new and improved wire protecting ring apparatus that includes a protector portion that can be readily removed by hand, without the need for a hand tool, when the wiring protective function is no longer needed.

Still a further object of the present invention is to provide a new and improved wire protecting ring apparatus which provides a ring around the access holes, wherein the ring is a part of the overall electrical wiring protector.

Yet still another object of the present invention is to provide a novel method of using a protector ring having a removable plate, partition or cover for temporarily protecting electrical wires in an electrical box during installation thereof and/or of material surfaces placed in proximity thereto.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved wire protecting ring apparatus embodying the principles and concepts of the present invention will be described.

Figure 1:
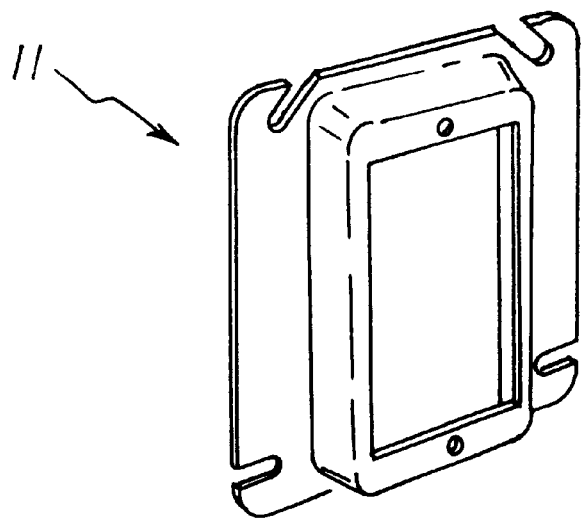
FIG. 1 is a front perspective view showing a PRIOR ART ring for attachment to an electrical box.

FIG. 1 shows a PRIOR ART ring 11 which does not include a removable protector plate and offers no protection to wires in an open electrical box.

Turning to FIGS. 2–5, there is shown a first embodiment of the wire protecting ring apparatus of the invention generally designated by reference numeral 10. In the first embodiment, a wire protecting ring apparatus 10 includes a back plate 12 which includes peripheral fastener reception slots 14 and which includes a back plate central access channel 15. A riser wall 16 projects outward from the back plate 12, wherein the riser wall 16 is located peripheral to the back plate central access channel 15. A front frame 18 is connected to a top portion of the riser wall 16, wherein the front frame 18 defines a front frame access channel 17 which is in partial registration with the back plate central access channel 15. The front frame 18 includes fastener reception channels 20. A pair of links are connected to opposite sides of the front frame 18, wherein the links are located along a common link axis 24. A removable protector plate or partition 26 is connected to the pair of links, wherein the removable protector plate 26 is located in the front frame access channel 17 and covers the back plate central access channel 15. Preferably, the links are twist links 22, and the removable protector plate 26 is separated from the twist links 22 by twisting the removable protector plate 26 around on the twist links 22, around the link axis 24.

Preferably, the back plate 12 and the front frame 18 lie in spaced-apart parallel planes. Preferably, the riser wall 16 has a height that is approximately equal to a thickness of a sheet of drywall.

With one embodiment of the invention, the front frame access channel 17 and the back plate central access channel 15 are large enough to receive a single electrical receptacle.

Figure 6:
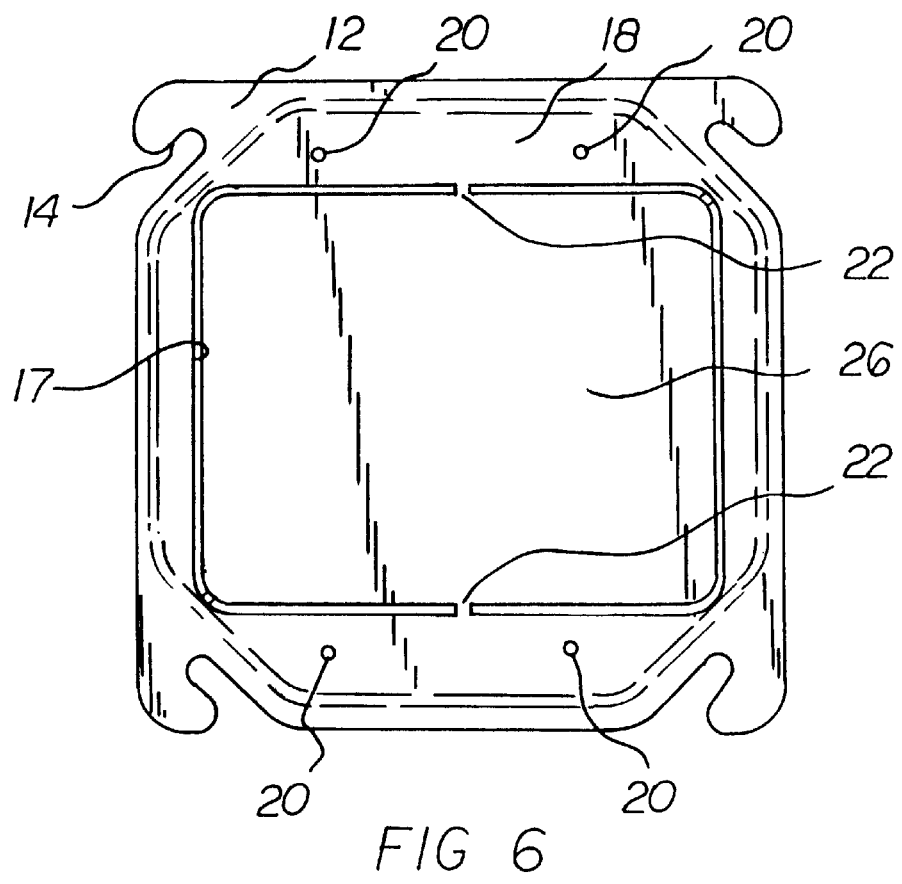
FIG. 6 is a front view of a second embodiment of the invention which is a two-gang embodiment.

Turning to FIG. 6, a second embodiment of the invention is shown. Reference numerals are shown that correspond to like reference numerals that designate like elements shown in the other figures. With the second embodiment, the front frame access channel 17 and the back plate central access channel 15 are large enough to receive two electrical receptacles. In addition, it is contemplated that embodiments of the invention can be made to accommodate up to nine electrical receptacles or switches.

To use either embodiment of the wire protecting ring apparatus 10 of the invention, an open electrical box (not shown), commonly known in the trade as a junction box, is pre-installed on a surface such as wall or ceiling (not shown). The electrical box has wires (not shown) inside it, and the wires are used for connecting to electrical fixtures, such as electrical receptacles and/or electrical switches. Since the electrical box is open, installed or otherwise inserted electrical wires therein are not covered or protected.

Figure 2:
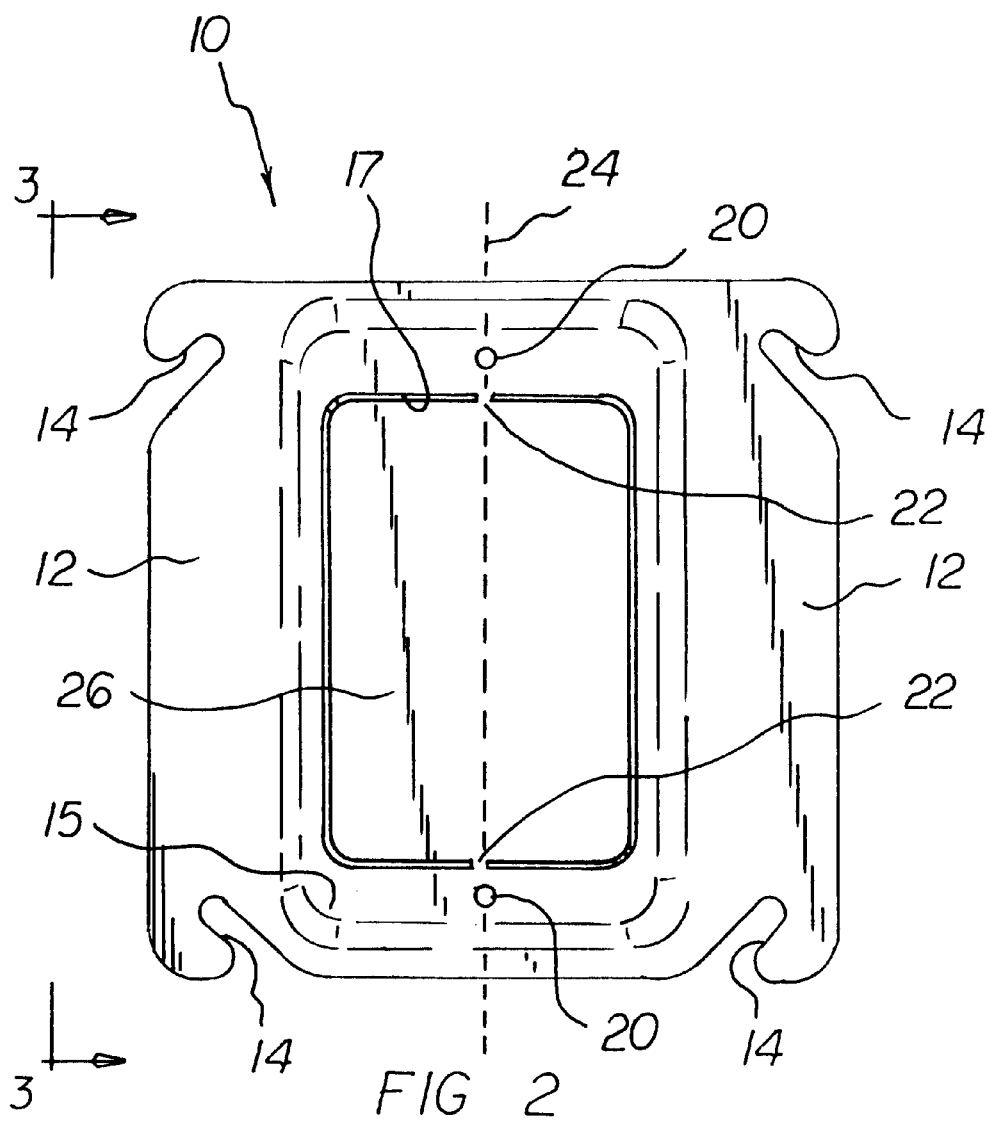
FIG. 2 is a front view of a first embodiment of a wire protecting ring apparatus of the invention.
Figure 3:
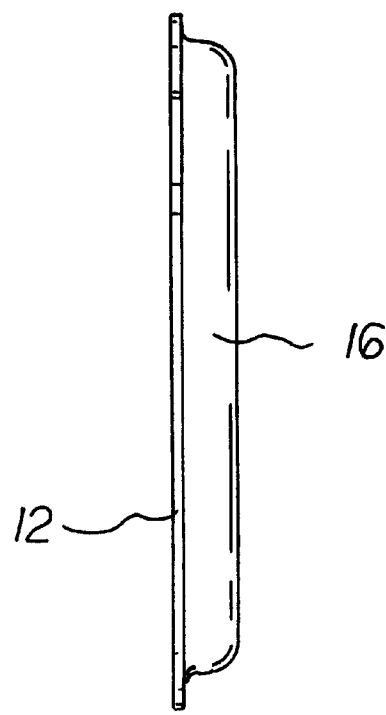
FIG. 3 is a side view of the embodiment of the wire protecting ring apparatus of FIG. 2 taken along line 3-3 thereof.
Figure 4:
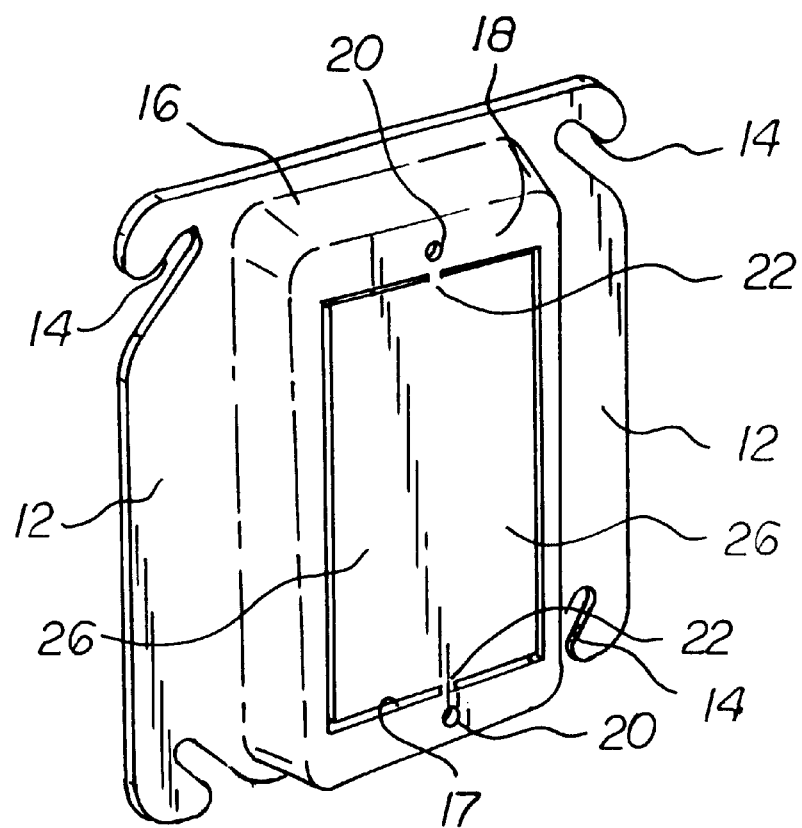
FIG. 4 is a front perspective view of the embodiment of the invention shown in FIGS. 2 and 3.
Figure 5:
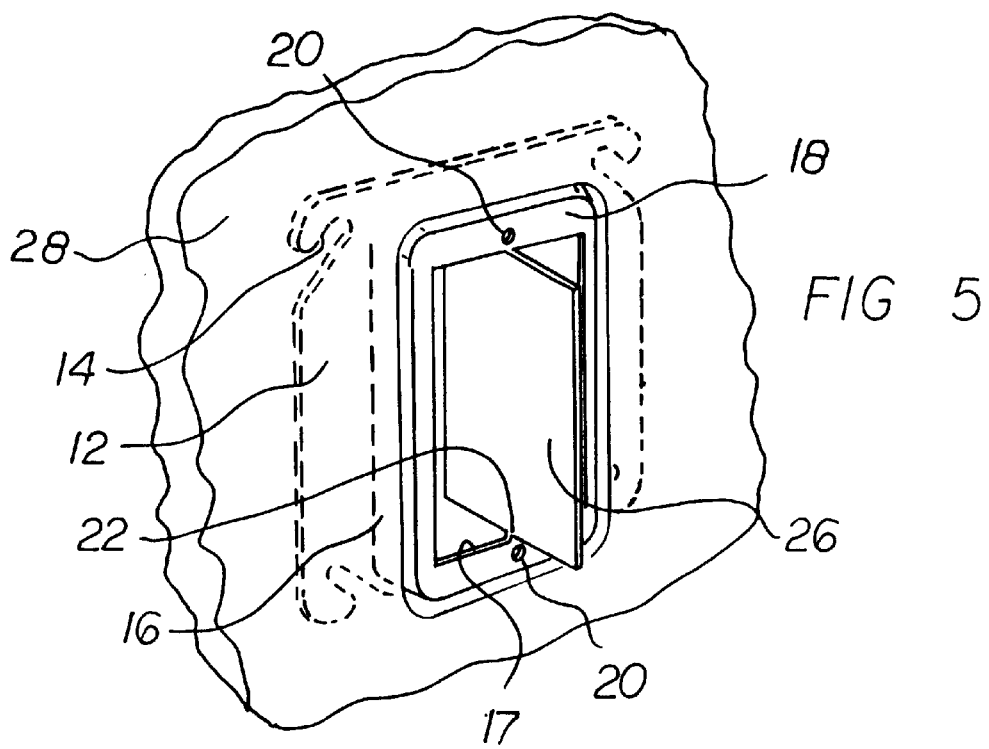
FIG. 5 is a front perspective view of the embodiment of the invention shown in FIG. 4, with a piece of drywall installed around the embodiment of the invention and with the central wire protection plate being twisted around twist links prior to separation from and removal from the apparatus.

The ring apparatus 10 of the invention is used with an open electrical box prior to installation of a sheet of drywall 28 (see FIG. 5) around the open electrical box. More specifically, the ring apparatus 10, such as shown in FIGS. 2–4, is attached to the open electrical box by placing the fastener reception slots 14 of the back plate 12 in registration with fastener reception channels in the electrical box (not shown). Then, fasteners, such as screws (not shown) are used to fasten the back plate 12 of the ring apparatus 10 of the invention to the electrical box. Once the ring apparatus 10 is fastened to the electrical box, the removable protector plate 26 covers the front frame access channel 17 and covers the wires inside the electrical box.

Then, an opening is made in a sheet of drywall 28 that is to be placed on the wall, wherein the opening in the sheet of drywall 28 is in registration with the front frame 18 and the front frame access channel 17 of the ring apparatus 10. The opening in the sheet of drywall 28 allows access to the electrical box. To make the opening in the sheet of drywall 28, the sheet of drywall 28 is placed up against the front frame 18 and the removable protector plate 26. Then, a drywall cutting tool, such as an a hand-held drill or router or jigsaw, is used to cut through the sheet of drywall 28. First, the cutting portion of the cutting tool can cut through the sheet of drywall 28 until the removable protector plate 26 is reached by the cutting portion. Then, the cutting portion can be moved to the left of, to the right of, to above, or to below the riser wall 16 by cutting through the sheet of drywall 28. The removable protector plate 26 prevents the cutting portion from entering the electrical box and cutting the wires therein. Once the cutting portion reaches the outside of the riser wall 16, the cutting portion can be guided peripherally around the riser wall 16 to create a window in the sheet of drywall 28 which encompasses the riser wall 16 of the ring apparatus 10. When the window has been cut out from the sheet of drywall 28, the sheet of drywall 28 can be pressed up against the wall so that the front frame 18 is approximately co-planar with the top surface of the sheet of drywall 28.

Next, the removable protector plate 26 is removed from the ring apparatus 10 to permit attachment of the electrical receptacles and/or electrical switches. To do this, pressure is applied to the removable protector plate 26 on one side of the link axis 24. This causes the removable protector plate 26 to partially rotate around the twist links 22 in a first direction. Then, pressure is applied to the removable protector plate 26 on the opposite side of the link axis 24. This causes the removable protector plate 26 to partially rotate around the twist links 22 in the opposite direction. By repeating this back and forth rotation of the removable protector plate 26 around the link axis 24, and by pulling outward on the removable protector plate 26, the twist links 22 are sufficiently fatigued so that they break. Then, the removable protector plate 26 can be removed from the ring apparatus 10. When this is done, there is clear access to the wires inside the electrical box.

Then, an electrical receptacle or electrical switch (not shown) is attached to the wires, and the electrical receptacle or electrical switch is fastened to the front frame 18 of the ring apparatus 10 using fasteners (not shown) which are received in the fastener reception channels 20 of the front frame 18. Finally, a cover plate (not shown) can be fastened to the electrical receptacle or electrical switch so that the cover plate covers the insides edges of the window in the sheet of drywall 28 and covers the front frame 18 of the ring apparatus 10 of the invention.

The components of the wire protecting ring apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved wire protecting ring apparatus that is low in cost, relatively simple in design and operation, and which may advantageously be used to protect wires inside electrical utility boxes from damage during cutting operations of cutting access holes in drywall or wallboard. With the invention, a wire protecting ring apparatus is provided which does not require duplicate efforts in reverse, for installation and removal. With the invention, a wire protecting ring apparatus is provided which serves as a guide for drywall that is installed. With the invention, a wire protecting ring apparatus is provided which includes a protector portion that can be readily removed by hand, without the need for a hand tool, when the wiring protective function is no longer needed. With the invention, a wire protecting ring apparatus provides a ring around the access holes, wherein the ring is a part of the overall electrical wiring protector.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A protective ring apparatus for an electrical junction box, comprising:

a back plate which includes peripheral fastener reception slots and which includes a back plate central access channel, a riser wall projecting outward from said back plate, wherein said riser wall is located peripheral to said back plate central access channel, a front frame connected to a top portion of said riser wall, wherein said front frame defines a front frame access channel which is in partial registration with said back plate central access channel, at least one link connected to a side of said front frame, wherein said at least one link is located along an axis extending transversely with respect to said front frame access channel, and a removable protector plate connected to said at least one link, wherein said removable protector plate normally is located in said front frame access channel and covers said back plate central access channel, and wherein said removable protector plate being removable from said front frame access channel by twisting said protector plate and said at least one link about said axis.

2. The apparatus of claim 1 wherein at least one other link is connected to another side of said front frame, said at least one other link being connected to said removable protector plate along said axis.

3. The apparatus of claim 2 wherein:

said links are twist links, and said removable protector plate is separable from said twist links by twisting said removable protector plate on said twist links relative to said link axis.

4. The apparatus of claim 1 wherein said back plate and said front frame lie in spaced-apart parallel planes.

5. The apparatus of claim 1 wherein said riser wall has a height that is approximately equal to a thickness of a sheet of drywall.

6. The apparatus of claim 1 wherein said front frame access channel and said back plate central access channel are large enough to receive a single electrical receptacle.

7. The apparatus of claim 1 wherein said front frame access channel and said back plate central access channel are large enough to receive two electrical receptacles.

8. A method of protecting electrical wires in a pre-installed open box on a first surface prior to installing a sheet of surface material on the first surface, comprising the steps of:

(a) attaching a protective ring over the opening of said box after the latter is attached to said first surface, said protective ring having a removable protective partition thereon to cover said opening, (b) placing said surface material on said first surface to cover said first surface including said protective ring cover attached over said opening of said box, (c) removing a portion of said surface material to uncover said protective ring, and (d) removing said removable partition from said protective ring, wherein said movable partition is attached to said protective ring by at least one twistable link and said step (d) comprises the further step of:

(e) applying pressure to said removable partition to cause said removable partition to partially rotate relative to said twist link until said link is severed and said partition is thereby removed from said protective ring.

9. The method of claim 8 wherein said at least one twist link is twistable about an axis located in a plane common to said partition, said at least one link and said protective ring, and said step (e) of partially rotating comprises the further step of:

(f) applying pressure to said partition to twist said partition about said axis repeatedly in opposite directions relative to said axis until said twist link becomes severed.

* * * * *